3,083,614
APPARATUS FOR THE AUTOMATIC CORRECTION OF COLOR CASTS IN PHOTOGRAPHIC COLOR PRINTS
Anton L. Veit, Barbarossaring 30, Kaiserslautern, Germany
Filed Jan. 29, 1958, Ser. No. 711,900
Claims priority, application Germany Feb. 25, 1957
8 Claims. (Cl. 88—24)

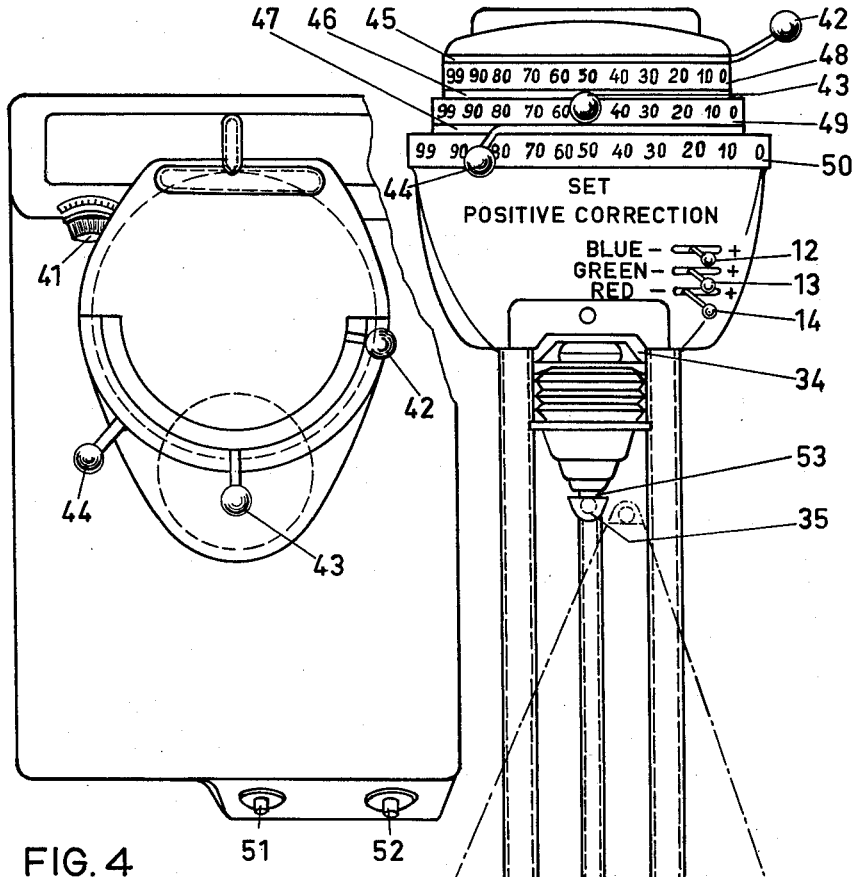
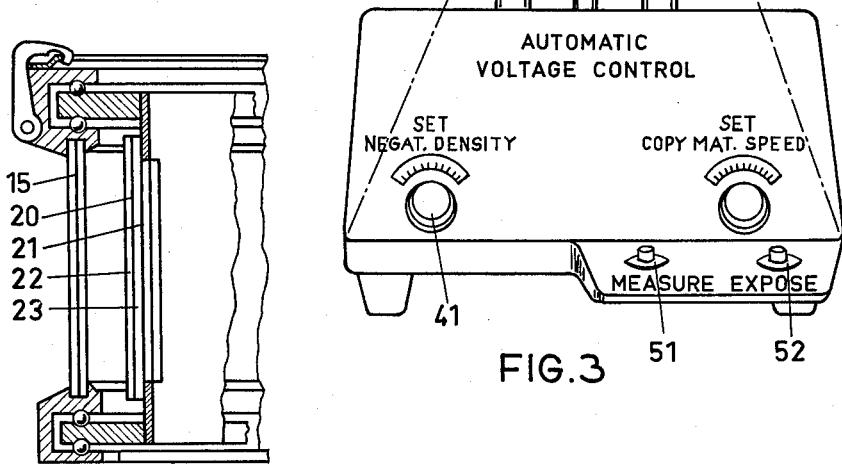
FIG. 4
FIG. 6
FIG. 3
INVENTOR
Anton L. Veit
BY
Richard S. Striker
ATTORNEY

United States Patent Office 3,083,614
Patented Apr. 2, 1963

One of the objects of the invention is to provide methods and means for automatic correction of color casts in photographic color prints which are working better and more rapidly than has been hitherto possible.

It is a further object of the invention to provide an easier method which can be put into practice without specially skilled personnel.

The invention consists in novel features and combinations hereinafter described and particularly pointed out in the appended claims.

The invention refers mainly to a procedure that automatically corrects the light source of a copying apparatus or enlarger by means of subtractive or additive correction filter wedges, so that from a given color negative or slide and a given positive-copying material a balanced color print will result and an apparatus to accomplish this purpose. The exposure of the copying material in this procedure will be made after the correction filters have been automatically adjusted, so that during the exposure no mechanical work in the apparatus can impair the sharpness of the print. This procedure is based on the assumption that a balanced color print will be achieved, when the three color densities of the negative to be copied are equalized by means of correction filters and when to this filter combination the necessary filter correction for the printing material is added.

An apparatus according to the invention works in two separate steps. In the first step a filter combination is automatically set, that will achieve a balanced color print. The second step is an exposure, that will automatically be shut off, when the printing material has enough exposure. This second step is initiated by a pushbutton switch, after all movement from the automatic filter setting has ceased. This two-step-method avoids movement during the exposure and therefore makes certain, that the exposed print will be as sharp as possible, which is a great advantage in comparison with other known procedures.

There is no loss of time by this method, because during the automatic filter setting (which takes about 5 seconds or less) the printing material can be put on the easel. No light can pass to the easel, because of the photo cell, which is located in front of the lens.

It is another advantage of this invention that the complete area of the negative is measured, regardless of the fact that only part of it might be printed.

Still another advantage of this method is, that when more than one print from a negative is wanted, or when a complete film has the same color characteristic, then the first step of the automatic is only once put in action. After this, only the second step of the automatic has to be put into action for each print. The automatic filter setting device is only put in action, when it is actually needed.

A very remarkable advantage offered by this invention is, that no special skill is necessary to operate this apparatus. The hitherto necessary test strips and trial exposures are practically completely eliminated, so that a great deal of expensive color material and time is saved.

Further objects and advantages of the invention will be more fully understood from the following description taken in connection with the accompanying drawings of an embodiment of the invention.

In the following the basic principles of operation are explained. An apparatus may be used in which, for the purpose of measuring color densities, one photo cell is placed at the most advantageous position, that is in front of the lens of the copying apparatus or enlarger. This cell is successively exposed to one of the three basic spectral ranges of the printing light by means of light blockading filters, that shut off the two other spectral ranges. At the same time a correction filter wedge (preferably in ring form), in the complementary color to the blockading filter, is moved into the beam of the printing light and turned by a small electric motor, until a predetermined color density is reached and in its adjusted stage the driving mechanism is brought out of action and the correction filter is tilted out of the light beam by electronic or electro-mechanical means. The other two spectral ranges are automatically adjusted in the same way. Due to this procedure all three correction filter wedges are adjusted in such a way, that the densities of the three colors of the negative are balanced.

Then the light blockading filter set moves out of the beam of the printing light, closing a contact that moves the three adjusted correction filter wedges back into the beam of the printing light. The filters, which are interlocked as regard to their reverse movement are moved back, until the correction filter wedge with the lowest filter value is moved to zero position. By this movement the neutral density is removed from the filter combination. Again two of the correction filter wedges which make the positive correction for the printing material, move forward until they touch two, for this purpose pre-set levers and stop in this position. Should again a neutral density, different from zero, result through this movement, then the three correction filter wedges will once more reverse their movement until the lowest filter value will be moved to zero position.

The apparatus is now automatically adjusted to give a balanced color print from the negative to be printed and for the printing material to be used. A change in the color balance can be made, if this should be deemed necessary on account of the subject from which the picture was taken. This can be accomplished by adjusting neutral density wedges on the light blockading filter set. The adjustment of plus or minus blue, green or red is accomplished with small levers.

For the second step—the exposure itself—the photo cell now is turned about 180° and faces the easel on which the printing material is placed. The photo cell now is ready to measure the reflected light from the projected image and regulates in this way the exposure time. A push button switch starts the exposure.

The figures show by way of example an embodiment of the invention but it may be well understood that some of the shown details, or the apparatus itself, could be of different design.

FIG. 3 shows a front view of the apparatus.

FIG. 4 shows a plan view of the apparatus.

FIG. 5 shows the mantle of one of the correction filter cylinders, laid out flat.

FIG. 6 shows a sectional view of the filtering with the stationary filter segment.

Corresponding parts are showing the same numbers in all figures.

Figure 1:
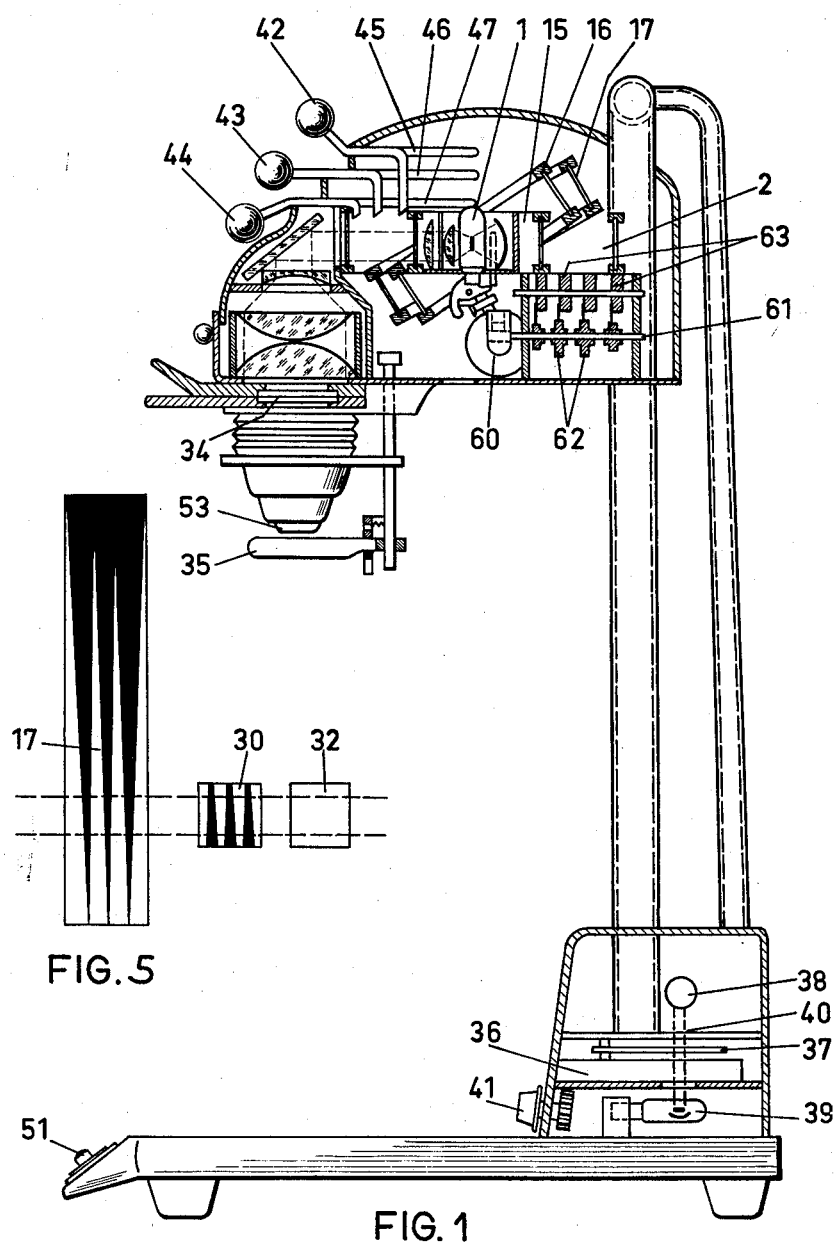
FIG. 1 shows a sectional side view of the apparatus in form of an enlarger or optical copying apparatus.
Figure 2:
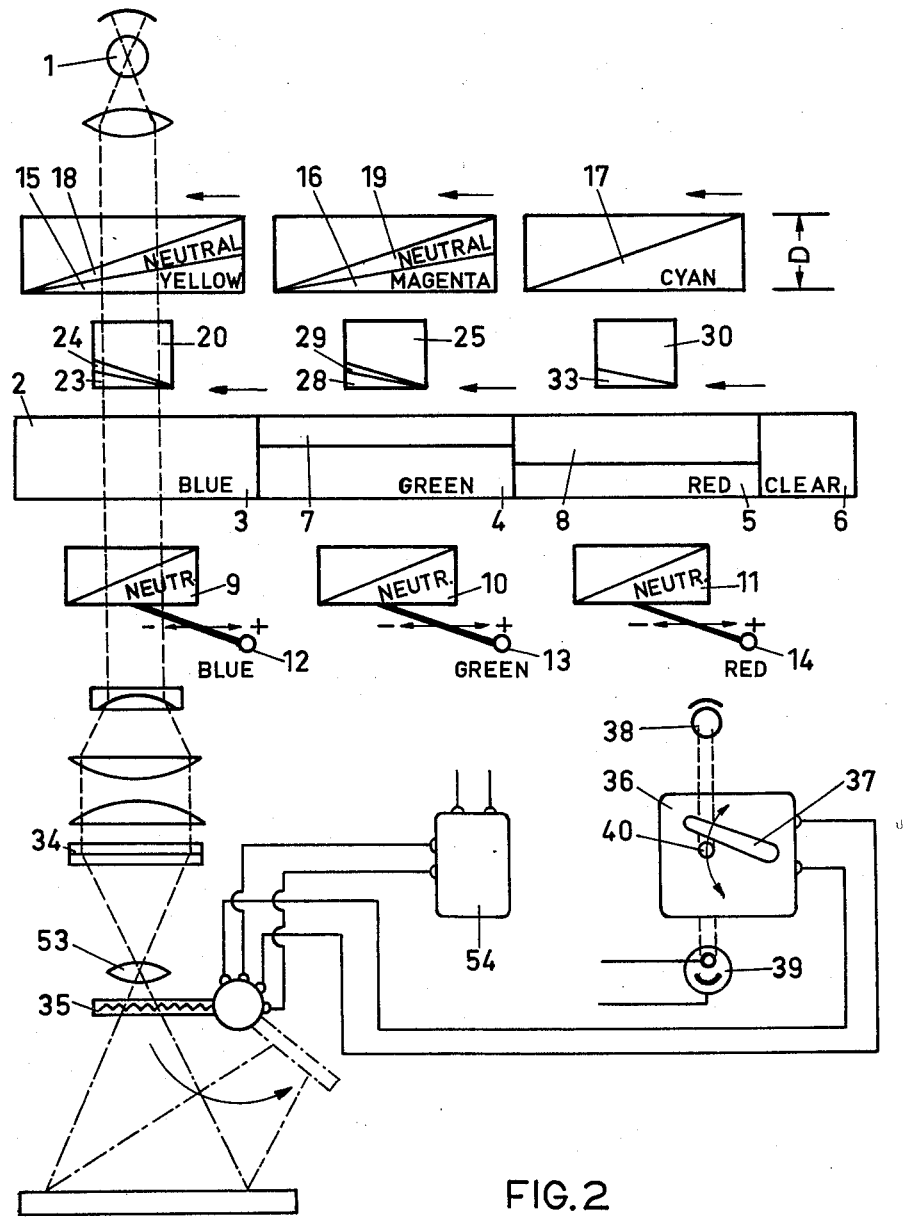
FIG. 2 shows a working diagram of the principle involved in the automatic correction of color casts as described in this patent application.

The apparatus for the automatic filter setting contains a printing light 1. A blockading filter ring 2 with the color segments blue 3, green 4 and red 5 and a clear section 6 around the circumference of its transparent mantle arranged. Through the clear section 6 unfiltered printing light can pass the cylinder. The three additive colors blue, green and red are balanced with neutral density filters 7 and 8 to achieve equal densities in all colors, so that—when no negative is in the apparatus— the galvanometer 36 will register equal light values for each of the three filter colors. For each of the three blockading filter segments 3, 4, 5 of this ring there are corresponding adjustable neutral density wedges 9, 10, 11. By adjusting these, the color balance of the print can be changed, if this should be deemed necessary on account of the object of which the picture was taken. These neutral density wedges 9, 10, 11 are formed by solid black, comblike arranged triangles, pointing into the direction of the movement. The filters show on their bases the highest density and on their points the lowest. These neutral density wedges 9, 10, 11 can be adjusted with three small levers 12, 13, 14. It is therefore possible to adjust for instance, for plus or minus blue, green or red. Each of these wedges is moved into the copying light with the blockading filter belonging to it, so that the light value registering on the galvanometer 36 is higher or lower, according to the adjustment of the levers 12, 13, 14. On the bottom of the blockading filter ring are cams for the purpose of closing the electrical circuits of the correction filter wedges 15, 16, 17, so that always the correction filter wedge, belonging to the blockading filter segment is moved into the light beam of the printing light.

Three correction filter wedges in ring form 15, 16, 17, are concentrically placed around the printing light. These rings tilt automatically into or out of the beam of the printing light as described below. Each of these rings has on its circumference a correction filter wedge in one of the subtractive colors yellow, magenta and cyan. These corrective filter wedges also are balanced with neutral filters 18, 19 to register equal light values on the galvanometer, when no negative is in the negative holder. For instance, 30 yellow, or 30 magenta, or 30 cyan will register, without negative, the same light values. The corrective filter wedges 15, 16, 17 are constructed in such a way that filter foil or one density, preferably 200, in the shape of comb teeth is sandwiched in the direction of movement between two glass cylinders. The filter foil can also be made by printing this design on a transparent foil (see FIG. 5).

The unequal distribution of color density within the light beam, that may be caused by the increasing color density of the correction filter wedges 15, 16, 17, is counteracted by the decreasing color densities of filter segments 20, 25, 30 of a second wedge, one for each of the correction filter wedges 15, 16, 17. These segments 20, 25, 30 being placed stationary on the inside or outside of each of these rings 15, 16, 17, move with them out of the light beam. The filter segments 20, 25, 30, each consisting of a square of glass 21, a square of opal glass 22. Sandwiched between these are sections of filter foils 23, 28, 33 with the same comblike arranged pattern as the corresponding correction filter wedges 15, 16, 17. The lowest color density is used in each of the three filter segments 20, 25, 30. Two of these filter segments 20, 25 have neutral density foils 24, 29, sandwiched with the filter foil to equalize the densities of all three segments. An absolute uniform light beam is thus achieved; its color density may be continuously varied from a color density value of zero to two hundred.

All four cylinders are made of a suitable material, for instance Plexiglas, and have on top or bottom cam rings for the purpose of electrically controlling their movement.

Of course it would also be possible to arrange the filter sets in such a way, as to place the subtractive colors yellow, magenta and cyan on the blockading filter ring 2 and the additive colors blue, green and red on the correction filter rings 15, 16, 17, but the first mentioned method will generally be found more suitable. A negative holder 34 serves to hold the color negative or slide to be printed.

A photo cell 35, which during the first step of the automatic operation measures the three color densities of the negative and during the second step, by a turn of about 180° measures the reflected light from the projected image on the easel at practically the optical center, and in this way assures a precise exposure control.

A galvanometer 36 interrupts by the movement of its needle 37 at a pre-set color density a light ray, falling from a small lamp 38 on photo cell 39. This action interrupts the electrical circuit of the correction filter wedge, which tilts in its adjusted stage, out of the beam of the printing light 1. An adjustable aperture 40 is provided, through which the light of the small lamp 38 falls on the photo cell 39. The adjustment of this aperture is for the purpose of changing the level of density at which the negative is measured. A knob 41 serves for making this adjustment. Three levers 42, 43, 44 serve for the positive filter correction. These levers can be adjusted for the filter combination which is necessary to balance the copying material. Below the slots 45, 46, 47 in which these levers 42, 43, 44 respectively move, a plurality of scales 48, 49, 50 are respectively arranged, which enable the operator to properly adjust this filter combination.

Two push button switches 51, 52 are provided, one 51 for starting the automatic filter setting device, the other 52 for the exposure.

The full-automatic filter adjustment works as follows: A color negative or slide is placed into the negative holder 34. The positive correction levers 42, 43, 44 are set for the correct balance of the printing material.

The push button switch 51 is pressed and the automatic action is started as follows:

(a) The printing light 1 is turned on.

(b) The photo cell 35 is brought in front of the lens 53.

(c) The electrical circuit for the rotation of the blockading filter ring 2 is closed. The cylinder will therefore rotate as the lower edge thereof engages one of the friction wheels 63 respectively driven by belt drives from pulleys 62 on shaft 61 which in turn is driven by the motor 60, whereby the blue filter segment 3 blockades the green and red spectral ranges of printing light 1. Through a cam on the bottom of the blue filter section 3, the electrical circuit of the yellow correction filter ring 15 is closed and tilts into the light beam of the printing light 1, begins to rotate until the pre-set color density is reached. The needle 37 of the galvanometer 36 will interrupt the light beam of lamp 38 and by this, the electrical circuit of the yellow filter cylinder 15 is interrupted, and tilts in its adjusted position out of the light beam of the printing light 1. The blockading filter ring keeps rotating, until the green segment 4 moves into the beam of the printing light. This cuts out the blue and red spectral ranges. The cam on this segment closes the circuit of the magenta correction filter wedge 16 and now this correction filter ring rotates until equal color density with blue is reached. Again the needle 37 of the galvanometer 36 interrupts the circuit now of the magenta filter ring 16. This ring now tilts in its adjusted state out of the beam of the printing light. The blockading filter ring 2 continues its rotation. The red segment 5 now moves into the beam of the printing light. The blue and green spectral ranges are then blocked. The cam on the red segment 5 closes the electrical circuit of the cyan correction filter wedge 17. The latter tilts now into the light beam and turns until equal color density with blue and green is reached. Then the needle 37 of the galvanometer 36 interrupts the electrical circuit of the cyan filter correction wedge 17.

All three color densities of the negative are now equalized. The blockading filter ring 2 now completes its rotation and the clear section 6 of this ring is now in the light beam of the printing light. Again a cam on the clear section closes the electrical circuits and tilts the three adjusted correction filter wedges 15, 16, 17 into the beam of the printing light. Another circuit now reverses the movement of the interlocked filter rings 15, 16, 17 until the one with the lowest filter value hits a zero stop. The neutral density is thus automatically removed out of this filter combination. Again the correction filter rings move forward until each one of these separately hits the pre-set levers 42, 43, 44 of the positive correction. There they stop and the filter combination is now also corrected for the printing material. Should another neutral density result from this correction, then the cylinders again will reverse their movement (interlocked) until the lowest filter value hits the zero stop.

The correction filter wedges 15, 16, 17 are now fully automatically adjusted to give a balanced color print from the negative to be printed and the positive printing material to be used. The first step is ended, it takes about 5 seconds or less.

During this time the printing material could be placed into the easel and the second step is initiated by pressing another push-button switch 52. This turns on the printing light 1. The photo cell 35, that has automatically turned away from the lens and also turned by about 180° after completion of the filter adjustment, is switched from the galvanometer 36 to an electrical condensator 54 of standard construction, and now measures the reflected light from the projected image on the easel. In this position the current produced by photocell 35 controls the time for the exposure in a known manner by loading an electric condensator 54 to a pre-set loading condition. When this condition is reached, the printing light 1 turns automatically off. The exposure is completed.

The correction filter wedges shown in this invention, can also be used in a manually operated printing apparatus or enlarger. They have a considerable advantage over another type of stepless turning filter set now on the market, because an absolute uniform field of filtered light with a stepless increase of color density from zero to two hundred is achieved by this invention.

Example of an automatic filter setting:

|  | Degrees on scale | | |
| --- | --- | --- | --- |
| (a) The automatic sets the filter combination to | 40 | 20 | 90 |
| (b) The interlocked filter rings reverse until the lowest filter value hits the zero stop, in this case it is the magenta filter—minus | 20 | 20 | 20 |
| Filter combination after deduction of the neutral density | 20 | 00 | 70 |
| (c) The positive correction is automatically added by the forward movement of the filter rings to a pre-set stop of the positive control levers 43, 44. The presumed positive correction being | 00 | 20 | 40 |
| New filter combination is now | 20 | 20 | 110 |
| (d) Interlocked filter rings again reverse as in (b)—minus | 20 | 20 | 20 |
| Final automatic filter setting for color balanced print | 00 | 00 | 90 |

Having thus described the method and one of the possible designs of an apparatus for carrying out my invention, what I claim is:

1. In a photographic color printing device, in combination, a source of a beam of light; a photo-electric cell arranged in said beam; means for interposing a colored image in said beam intermediate said source and said cell; a plurality of blocking filters, each adapted to selectively pass a different one of a plurality of spectral ranges of said beam; a plurality of compensating filters, each adapted to selectively pass a spectral range of said beam substantially complementary to the range of a corresponding one of said blocking filters, said compensating filters, being of adjustable density; means for consecutively inserting said blocking filters and for simultaneously inserting corresponding ones of said compensating filters in said beam intermediate said source and said photo-electric cell; means for consecutively adjusting the density of each one of said compensating filters to a density at which the light falling from said source serially through each one of said blocking filters, the corresponding one of said compensating filters, and said image on said photo-electric cell causes the same predetermined output of said photo-electric cell; and means for inserting said plurality of compensating filters in adjusted condition simultaneously in said beam intermediate said source and said photo-electric cell in the absence of said blocking filters, so as to obtain a balanced print on a color-sensitive printing material placed in the beam of light passing through said colored image and said adjusted compensating filters.

2. In a photographic color printing device, in combination, a source of a beam of light; a photo-electric cell arranged in said beam; means for interposing a colored image in said beam intermediate said source and said cell; three blocking filters, each adapted to selectively pass a different one of the three basic spectral ranges of said beam; three compensating filters, each adapted to selectively pass a spectral range of said beam substantially complementary to the range of a corresponding one of said blocking filters, said compensating filters being of adjustable density; means for consecutively inserting said blocking filters and for simultaneously inserting corresponding ones of said compensating filters in said beam intermediate said source and said photo-electric cell; means for consecutively adjusting the density of each one of said compensating filters to a density at which the light falling from said source serially through each one of said blocking filters, the corresponding one of said compensating filters, and said image on said photo-electric cell causes the same predetermined output of said photo-electric cell; and means for inserting said three compensating filters in adjusted condition simultaneously in said beam intermediate said source and said photo-electric cell in the absence of said blocking filters, so as to obtain a balanced print on a color-sensitive printing material placed in the beam of light passing through said colored image and said adjusted compensating filters.

3. In a photographic color printing device, in combination, a source of a beam of light; a photo-electric cell arranged in said beam; means for interposing a colored image in said beam intermediate said source and said cell; a support; three blocking filters mounted on said support, each adapted to selectively pass a different one of the three basic spectral ranges of said beam; a plurality of carriers; three compensating filters mounted on respective ones of said carriers; each adapted to selectively pass a spectral range of said beam substantially complementary to the range of a corresponding one of said blocking filters, said compensating filters being of adjustable density; means for moving said support so as to consecutively insert said blocking filters in said beam intermediate said source and said photo-electric cell, and for consecutively moving said carriers so as to insert said compensating filters simultaneously with corresponding ones of said blocking filters in said beam intermediate said source and said photo-electric cell; means for consecutively adjusting the density of each one of said compensating filters to a density at which the light falling from said source serially through each one of said blocking filters, the corresponding one of said compensating filters, and said image on said photo-electric cell causes the same predetermined output of said photo-electric cell; and means for inserting said three compensating filters in adjusted condition simultaneously in said beam intermediate said source and said photo-electric cell in the absence of said blocking filters, so as to obtain a balanced print on a color-sensitive printing material placed in the beam of light passing through said colored image and said adjusted compensating filters.

4. In a photographic color printing device, in combination, a source of a beam of light; a photo-electric cell arranged in said beam; means for interposing a colored image in said beam intermediate said source and said cell; a plurality of blocking filters, each adapted to selectively pass a different one of a plurality of spectral ranges of said beam; a plurality of compensating wedge filters, each adapted to selectively pass a spectral range of said beam substantially complementary to the range of a corresponding one of said blocking filters; means for consecutively inserting said blocking filters and for simultaneously inserting respective portions of corresponding ones of said compensating filters in said beam intermediate said source and said photo-electric cell; means for consecutively adjusting the position of each one of said compensating filters in such a manner that the light falling from said source serially through each one of said blocking filters, the inserted portion of the corresponding one of said compensating filters, and said image on said photo-electric cell causes the same predetermined output of said photo-electric cell; and means for inserting said plurality of compensating filters in adjusted position simultaneously in said beam intermediate said source and said photo-electric cell in the absence of said blocking filters, so as to obtain a balanced print on a color-sensitive printing material placed in the beam of light passing through said colored image and said adjusted compensating filters.

5. In a photographic color printing device, in combination, a source of a beam of light; a photo-electric cell arranged in said beam; means for interposing a colored image in said beam intermediate said source and said cell; a plurality of blocking filters, each adapted to selectively pass a different one of a plurality of spectral ranges of said beam; a plurality of compensating filters, each adapted to selectively pass a spectral range of said beam substantially complementary to the range of a corresponding one of said blocking filters, said compensating filters being of adjustable density; means for consecutively inserting said blocking filters and for simultaneously inserting corresponding ones of said compensating filters in said beam intermediate said source and said photo-electric cell; means for consecutively adjusting the density of each one of said compensating filters to a density at which light falling from said source serially through each one of said blocking filters, the corresponding one of said compensating filters, and said image on said photo-electric cell causes the same predetermined output of said photo-electric cell; means for inserting said plurality of compensating filters in adjusted condition simultaneously in said beam intermediate said source and said photo-electric cell in the absence of said blocking filters; and means for supporting color-sensitive printing material in a position to receive light passing from said source through said colored image and said compensating filters for exposing said color-sensitive material with said light.

6. In a photographic color printing device, in combination, a source of a beam of light; a photo-electric cell arranged in said beam; means for interposing a colored image in said beam intermediate said source and said cell; a plurality of blocking filters, each adapted to selectively pass a different one of a plurality of spectral ranges of said beam; a plurality of compensating filters, each adapted to selectively pass a spectral range of said beam substantially complementary to the range of a corresponding one of said blocking filters, said compensating filters being of adjustable density; means for consecutively inserting said blocking filters and for simultaneously inserting corresponding ones of said compensating filters in said beam intermediate said source and said photo-electric cell; means for consecutively adjusting the density of each one of said compensating filters to a density at which light falling from said source serially through each one of said blocking filters, the corresponding one of said compensating filters, and said image on said photo-electric cell causes the same predetermined output of said photo-electric cell; means for inserting said plurality of compensating filters in adjusted condition simultaneously in said beam intermediate said source and said photo-electric cell in the absence of said blocking filters; means for supporting color-sensitive printing material in a position to receive light passing from said source through said colored image and said compensating filters for exposing said color-sensitive material with said light; means for mounting said photo-electric cell for movement out of the direct path of said light beam and into a position in which said photo-electric cell receives light reflected by said color-sensitive printing material; and means operatively connected to said photo-electric cell in said position in which it receives light reflected by said color-sensitive printing material for controlling exposures of said color-sensitve printing material by said beam of light passing through said color image and said adjusting compensating filters.

7. In a photographic color printing device, in combination, a source of a beam of light; a photo-electric cell arranged in said beam; means for interposing a colored image in said beam intermediate said source and said cell; a plurality of blocking filters, each adapted to selectively pass a different one of a plurality of spectral ranges of said beam; a plurality of compensating filters, each adapted to selectively pass a spectral range of said beam substantially complementary to the range of a corresponding one of said blocking filters, each of said compensating filters having a portion of substantially zero density and adjacent portions gradually increasing in density; means for consecutively inserting said blocking filters and for simultaneously inserting corresponding ones of said compensating filters in said beam intermediate said source and said photo-electric cell and for moving during insertion of each of said blocking filters the corresponding compensating filter to an adjusted position in which a portion of increased density is located in the path of light from said source so that light falling from said source through each one of said blocking filters, the portion of increased density of the corresponding one of said compensating filters, and said image on said photo-electric cell will produce the same predetermined output of said photo-electric cell; means for inserting said plurality of compensating filters in adjusted position simultaneously in said beam intermediate said source and said photo-electric cell in the absence of said blocking filters; and means for simultaneously moving said plurality of compensating filters while maintaining the adjusted relative positions to each other until the compensating filter having the lowest adjusted density is moved to a position in which the portion of substantially zero density thereof is moved into said beam of light.

8. In a photographic color printing device, in combination, a source of a beam of light; a photo-electric cell arranged in said beam; means for interposing a colored image in said beam intermediate said source and said cell; a plurality of blocking filters, each adapted to selectively pass a different one of a plurality of spectral ranges of said beam; a plurality of compensating filters, each adapted to selectively pass a spectral range of said beam substantially complementary to the range of a corresponding one of said blocking filters, each of said compensating filters having a portion of substantially zero density and adjacent portions gradually increasing in density; means for consecutively inserting said blocking filters and for simultaneously inserting corresponding ones of said compensating filters in said beam intermediate said source and said photo-electric cell and for moving during insertion of each of said blocking filters the corresponding compensating filter to an adjusted position in which a portion of increased density is located in the path of light from said source so that light falling from said source through each one of said blocking filters, the portion of increased density of the corresponding one of said compensating filters, and said image on said photo-electric cell will produce the same predetermined output of said photo-electric cell; means operatively connected to said photo-electric cell for automatically stopping the adjusting movement of each of said compensating filters when the respective compensating filter has been moved to an adjusted position in which light passing from said source through the portion of increased density of said compensating filter, the corresponding blocking filter and the image has produced said predetermined output of said photo-electric cell; means for inserting said plurality of compensating filters in adjusted position simultaneously in said beam intermediate said source and said photo-electric cell in the absence of said blocking filters; and means for simultaneously moving said plurality of compensating filters while maintaining the adjusted relative positions to each other until the compensating filter having the lowest adjusted density is moved to a position in which the portion of substantially zero density thereof is moved into said beam of light.

References Cited in the file of this patent

UNITED STATES PATENTS

| | | |
|---|---|---|
| 970,111 | Ramstein | Sept. 13, 1910 |
| 2,256,385 | Evans et al. | Sept. 16, 1941 |
| 2,388,842 | Hanson | Nov. 13, 1945 |
| 2,544,196 | Varden | Mar. 6, 1951 |
| 2,708,389 | Kavanagh | May 17, 1955 |
| 2,764,060 | Horak | Sept. 25, 1956 |
| 2,794,365 | Baasner et al. | June 4, 1957 |
| 2,844,988 | Lize et al. | July 29, 1958 |